Feb. 22, 1966  R. G. TESSMER  3,236,097
AIR PRESSURE GAGE
Filed May 17, 1963
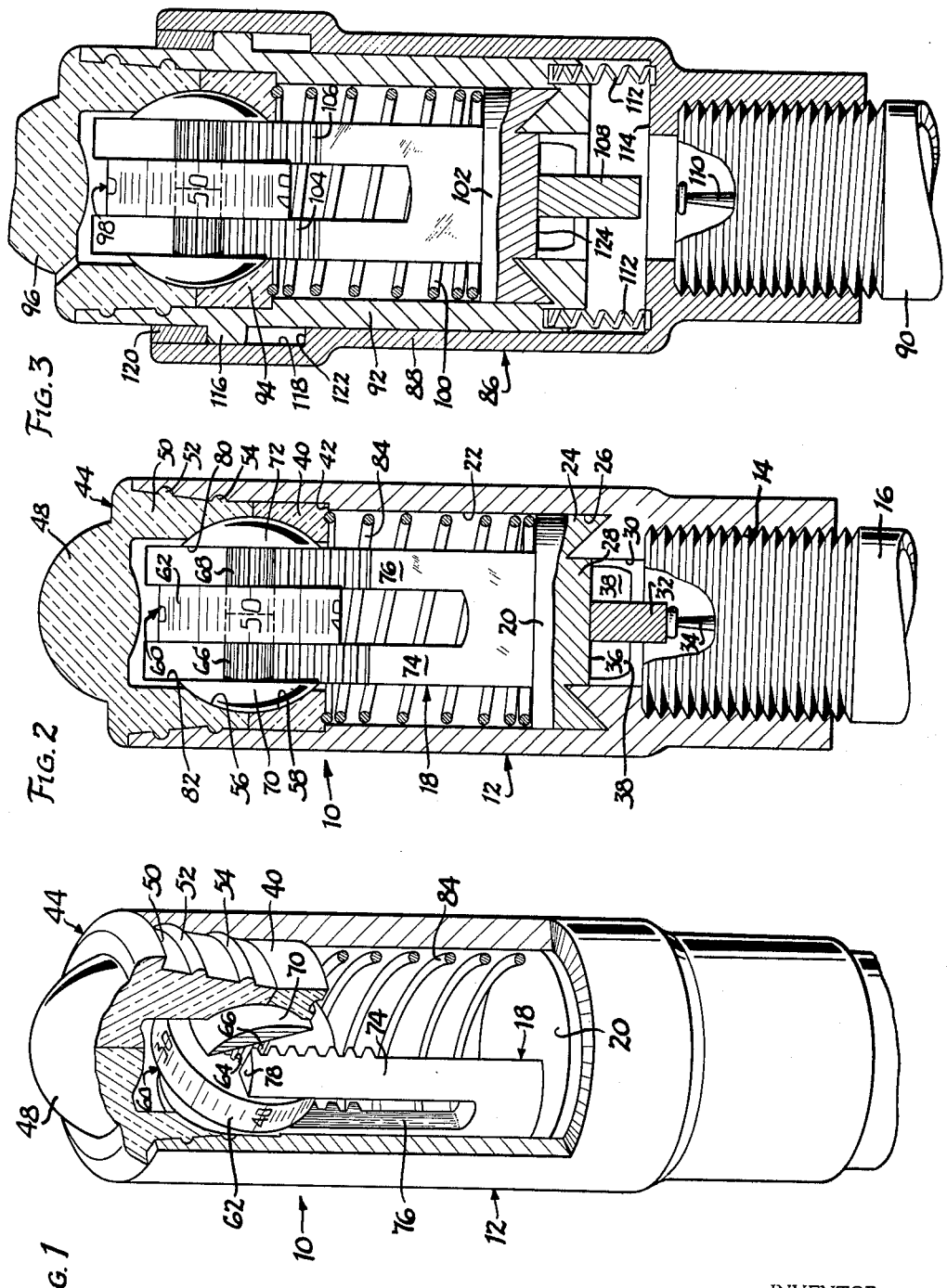
INVENTOR.
ROBERT G. TESSMER
BY
WILSON, SETTLE & CRAIG
ATTORNEYS

3,236,097
AIR PRESSURE GAGE
Robert G. Tessmer, Dearborn, Mich., assignor to Lattimore & Tessmer, Inc., Detroit, Mich., a corporation of Michigan
Filed May 17, 1963, Ser. No. 281,171
9 Claims. (Cl. 73—146.8)

This invention relates to an air pressure gage, and more particularly to an air pressure gage for permanent mounting on a vehicle tire to provide a reading of the tire air pressure whenever desired.

The proper maintenance of vehicle tires requires that the air pressure in the tires be maintained within a specified pressure range at all times. It is common practice to ask a gas station attendant to check the tire pressure at times when the vehicle is being refueled. However, this type of maintenance, even when faithfully followed, does not provide for checking the tire pressure in the intervals between refuelling. Preferred tire maintenance requires a check of the tire pressure at least once a day.

The present invention provides an air pressure gage which has a simplified design permitting manufacture at a very low cost. This low cost permits the use of the device as a permanent fixture on a tire with the result that the air pressure in each tire may be checked at any time.

It is therefore, an object of the invention to provide an air pressure gage which is adapted for permanent mounting on a vehicle tire.

Another object of the invention is to provide an air pressure gage having a simplified design configuration which permits the gage to be manufactured at a very low cost.

A further object of the invention is to provide an indicator element for the gage which is rotatably mounted in the gage by means of a novel bearing construction.

Another object of the invention is to provide drive means for the indicator element which result in a balanced drive and avoids cocking of the element.

A still further object of the invention is to provide an air pressure gage which requires a minimum amount of assembly time.

It is another object of the invention to provide, in one embodiment, an air pressure gage which gives a constant indication of the air pressure.

A further object of the invention is to provide in another embodiment, an air pressure gage which will give a reading when the eye piece is depressed.

Other objects of this invention will appear in the following description and appended claims, reference being had to the accompanying drawing forming a part of this specification wherein like reference characters designate corresponding parts in the several views.

In the drawing:

FIGURE 1 is an enlarged view in perspective, with parts broken away, of one embodiment of the present invention;

FIGURE 2 is a longitudinal sectional view of the air pressure gage of FIGURE 1; and FIGURE 3 is a longitudinal sectional view of another embodiment of the invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to FIGURES 1 and 2, it will be seen that the air pressure gage 10 includes an outer cylindrical casing member 12. The casing member 12 is internally threaded at one end 14 for threading engagement with externally threaded casing member 16 which conventionally comprises a portion of a vehicle tire valve mechanism.

A drive member 18 is slidingly mounted within the outer casing 12. The drive member 18 comprises a disc 20 which slidingly engages the interior surface 22 of the casing member 12. The disc 20 forms an air seal with the surface 22 to prevent the escape of air under pressure thereby. It will be noted that the disc 20 has an annular peripheral V-shaped ridge 24. This configuration aids in providing a satisfactory seal. The ridge 24 is received in a mating annular groove 26 when the air pressure is zero as illustrated in FIGURE 2.

A cylindrical projection 28 is provided on the disc 20 within the recess created by the ridge 24. The projection 28 is guidingly received within portion 30 of the casing interior. A plurality of guide fins 38 extend radially outwardly from the casing interior 30 and support a plunger 32. When the gage 10 is threaded onto valve member 16 as shown, the plunger 32 contacts and depresses the stem 34 of the tire valve mechanism. As is conventional, depression of the stem 34 opens the air valve (not shown) of the tire, allowing air under pressure to escape therefrom. This air under pressure exerts a force against surface 36 of the projection 28. This pressure causes movement of the drive member 18 to indicate the value of the air pressure as well be later described.

Air pressure indicator means are provided at the opposite end of the gage. As will be noted, a first ring 40 of transparent material, preferably a plastic, is received in the opposite end of the casing 12. The ring 40 abuts against a shoulder 42. A lens member 44, also of transparent material, is lockingly received within the end 46 to secure the assembly in place. It will be noted that the member 44 comprises a lens portion 48 from which extends a cylindrical wall portion 50. A pair of spaced apart annular projections 52, 54 are provided on the exterior of the wall portion 50. These projections are sprung into grooves provided on the interior surface of casing member 12 to lock the assembly in place.

Each of the members 40, 44 is provided with an interior annular spherical recess 56, 58. When the members 40, 44 are assembled together in the position shown, the recesses 56, 58 form a spherically shaped bearing surface. Rotatably received between the two bearing surfaces thus formed is an indicator element 60. The indicator 60 comprises a cylindrical member 62 which is provided on its outer surface with indicia indicating pounds per square inch of air pressure. The cylinder 62 has a central toothed opening 64 extending therethrough. A pair of gear elements 66, 68 are received, one on each side, within the opening 64 and are thus drivingly connected to the cylinder 62. The gear elements 66, 68 extend outwardly from the cylinder 62 and each has a spherically shaped portion 70, 72 at its outer end. These portions are received in the previously described spherical recesses and act as bearings for rotation of the indicator 60.

A driving connection between the gear portions 66, 68 and the slidable disc 20 is provided by means of a pair of spaced apart rack elements 74, 76 which extend from the disc 20. The rack elements engage the gear portions 66, 68 and act to rotate the entire indicator mechanism 60 upon movement of the disc 20, such movement occurring when air pressure is exerted against the surface 36 as previously described.

The surface of the rack elements opposite the gear teeth is curved as at 78. This curved portion is received in similarly curved slots 80, 82 provided interiorly of the members 40, 44. This arrangement serves to guide the racks during movement thereof.

A coil spring 84 is provided interiorly of the casing 12. The spring exerts a force between the ring member 40 and the disc 20. The ring member 40 is fixedly positioned, consequently, the spring constantly urges the movable disc 20 towards the valve stem 34. Air under pressure escaping from the vehicle tire will overcome the spring 84 and move the disc 20 towards the indicating mechanism 60. Air can escape by the ring 40 and lens member 44 to relieve the air pressure within the casing 12 during movement of the disc 20. Movement of the disc will continue until a balance is reached. Movement of the disc 20 causes rotation of the cylinder 62. The extent of transverse movement of the disc 20, which is translated into degrees of rotation of the cylinder 62, is a measure of the air pressure in the vehicle tire. The value thereof may be read from the surface of the cylindrical member 62 through the lens 48. The lens 48 may be of the magnifying type to enlarge the numerals for easy reading.

A modified version of the gage is illustrated in FIGURE 3. The gage 86 in FIGURE 3 differs from that illustrated in FIGURES 1 and 2 in that the lens must be depressed in order to achieve an air pressure reading. It will be noted that the gage 86 comprises an outer casing 88 which is threadingly received on valve casing member 90. An inner sliding casing member 92 is provided within the casing member 88. Ring 94, lens member 96, indicator structure 98, spring 100, disc 102, racks 104, 106 and plunger 108 are provided within the casing 92 in the arrangement previously described in connection with FIGURES 1 and 2.

The plunger 108 is normally held away from the valve stem 110 by means of a plurality of coil springs 112 which extend between the inner end of the inner casing 92 and the surface 114 of the outer casing 88. However, in some instances the springs 112 are not necessary because the centrifugal force resulting from rotation of the automobile wheel will move the plunger 108 away from the stem 110. An exterior annular flange 116 is provided on casing 92 adjacent the outer end thereof. The flange 116 is received within enlarged interior portion 118 of the outer casing 88. A ring 120 is secured within the outer casing 88 to lock the casing 92 in place.

In operation of the gage 86, when it is desired to read the air pressure, the inner casing 92 is moved towards the valve stem 110 by manual force applied to the lens member 96. Such movement will stop when the flange 116 abuts against the shoulder 122. At this point, the plunger 108 will have contacted and depressed the stem 110 whereupon escaping air under pressure will act against the surface 124 and cause the device to give an air pressure reading as previously described in connection with FIGURES 1 and 2.

In each of the embodiments illustrated, it will be noted that an inexpensive and easily assembled bearing arrangement for mounting of the indicator cylinder has been provided by the novel arrangement shown. Additionally, the use of a pair of gear racks, one on each side of the indicator element, to drive the indicator element, provides a balanced drive which prevents cocking of the indicator element and which results in accurate measurement of the air pressure.

Having thus described my invention, I claim:

1. An air pressure gage comprising a gage casing securable to the valve casing of a vehicle tire, a sliding member within the gage casing, means in the casing for depressing the valve stem of the vehicle tire, a pressure surface on the sliding member for contact with air under pressure emitted from the vehicle tire, resilient means urging the sliding member against the force exerted by the air pressure, an indicator element rotatably mounted in the gage casing, a gear on each side of the indicator element, said sliding member including a pair of spaced apart gear racks, each of said gear racks engaging one of said gears, air under pressure from the vehicle tire operating to move the sliding member against the action of said resilient means to thereby cause rotation of the indicator element to a position indicating the air pressure in the vehicle tire.

2. An air pressure gage comprising a gage casing securable to the valve casing of a vehicle tire, a sliding member within the gage casing, means in the casing for depressing the valve stem of the vehicle tire, a pressure surface on the sliding member for contact with air under pressure emitted from the vehicle tire, resilient means urging the sliding member against the force exerted by the air pressure, said gage casing having a pair of interior curved recesses, an indicator element in the casing, a member having a curved surface on each side of the indicator element and received in said curved recesses to rotatably mount the indicator element, drive means between the sliding member and indicator element to rotate the indicator element upon movement of the sliding member, air under pressure from the vehicle tire operating to move the sliding member against the action of said resilient means to thereby cause rotation of the indicator element to a position indicating the air pressure of the vehicle tire.

3. An air pressure gage comprising a gage casing securable to the valve casing of a vehicle tire, a sliding member within the gage casing, means in the casing for depressing the valve stem of the vehicle tire, a pressure surface on the sliding member for contact with air under pressure emitted from the vehicle tire, resilient means urging the sliding member against the force exerted by the air pressure, said gage casing having a pair of interior curved recesses, an indicator element in the casing, a gear on each side of the indicator element, a member having a curved surface on each gear and received in said curved recesses to rotatably mount the indicator element, said sliding member including a pair of spaced apart gear racks, each of said gear racks engaging one of said gears, air under pressure from the vehicle tire operating to move the sliding member against the action of said resilient means to thereby cause rotation of the indicator element to a position indicating the air pressure of the vehicle tire.

4. An air pressure gage comprising a gage casing securable to the valve casing of a vehicle tire, a sliding member within the gage casing, means in the casing for depressing the valve stem of the vehicle tire, a pressure surface on the sliding member for contact with air under pressure emitted from the vehicle tire, resilient means urging the sliding member against the force exerted by the air pressure, a pair of indicator mounting members secured within the outer end of the casing, the outermost of said members being transparent to permit viewing of the interior of the gage casing, each of said mounting members having a pair of diametrically opposed interior curved recesses, said recesses matching to form a pair of curved bearing surfaces, an indicator element in the casing, a member having a curved surface on each side of the indicator element and received in said curved recesses to rotatably mount the indicator element, drive means between the sliding member and indicator element to rotate the indicator element upon movement of the sliding member, air under pressure from the vehicle tire operating to move the sliding member against the action of said resilient means to thereby cause rotation of the indicator element to a position indicating the air pressure of the vehicle tire.

5. An air pressure gage comprising a gage casing securable to the valve casing of a vehicle tire, a sliding member within the gage casing, means in the casing for depressing the valve stem of the vehicle tire, a pressure surface on the sliding member for contact with air under pressure emitted from the vehicle tire, resilient means urging the sliding member against the force exerted by the air pressure, a pair of indicator element mounting members received in the outer ends of said gage casing, said mounting members having diametrically opposed interior curved recesses which match to form a pair of bearing surfaces, an indicator element in the casing, a gear on each side of the indicator element, said sliding member including a pair of spaced apart gear racks, each of said gear racks engaging one of said gears, a member having a curved surface on each gear and received in said bearing surfaces to rotatably mount the indicator element, air under pressure from the vehicle tire operating to move the sliding member against the action of said resilient means to thereby cause rotation of the indicator element to a position indicating the air pressure in the vehicle tire.

6. An air pressure gage comprising a gage casing internally threaded at one end for threading onto the valve casing of a vehicle tire, a disc slidingly received within the gage casing, said disc forming an air-tight seal with the interior walls of the casing, a plunger in the casing for depressing the valve stem of the vehicle tire, one surface of the disc being exposed to air under pressure emitted from the vehicle tire, spring means urging the disc against the force exerted by the air pressure, a pair of indicator element mounting members secured in the outer end of the gage casing, the outermost of said mounting members being transparent to permit viewing of the interior of the casing, said mounting members having diametrically opposed interior curved recesses which match to form a pair of diametrically opposed bearing surfaces, an indicator element in the casing, a gear on each side of the indicator element, a pair of spaced apart gear racks extending from said disc, each of said gear racks engaging one of said gears, a member having a curved surface on each gear and received in said bearing surfaces to rotatably mount the indicator element, air under pressure from the vehicle tire operating to move the disc against the action of said spring means to thereby cause rotation of the indicator element to a position indicating the air pressure in the vehicle tire.

7. An air pressure gage comprising an outer gage casing securable to the valve casing of a vehicle tire, an inner gage casing slidingly received within said outer gage casing, a sliding member within the inner gage casing, means in the inner casing for depressing the valve stem of the vehicle tire, a pressure surface on the sliding member for contact with air under pressure emitted from the vehicle tire, resilient means urging the sliding member against the force exerted by the air pressure, an indicator element rotatably mounted in the inner gage casing, a gear on each side of the indicator element, said sliding member including a pair of spaced apart gear racks, each of said gear racks engaging one of said gears, said inner gage casing being movable to a position to depress the valve stem of the vehicle tire to release air under pressure from the vehicle tire which operates to move the sliding member against the action of said resilient means to thereby cause rotation of the indicator element to a position indicating the air pressure in the vehicle tire.

8. An air pressure gage comprising an outer gage casing securable to the valve casing of a vehicle tire, an inner gage casing slidingly received within the outer gage casing, first resilient means urging said inner gage casing to a position away from the valve casing of the vehicle tire, a sliding member within the inner gage casing, means in the inner gage casing for depressing the valve stem of the vehicle tire, a pressure surface on the sliding member for contact with air under pressure emitted from the vehicle tire, second resilient means urging the sliding member against the force exerted by the air pressure, said inner gage casing having a pair of interior curved recesses, an indicator element in the inner casing, a member having a curved surface on each side of the indicator element and received in said curves recesses to rotatably mount the indicator element, drive means between the sliding member and indicator element to rotate the indicator element upon movement of the sliding member, depression of said inner gage casing against the action of said first resilient means causing depression of the valve stem of the vehicle tire and emission of air under pressure from the vehicle tire which operates to move the sliding member against the action of said second resilient means to thereby cause rotation of the indicator element to a position indicating the air pressure of the vehicle tire.

9. An air pressure gage comprising an outer gage casing securable to the valve casing of a vehicle tire, an inner gage casing slidingly received within the outer gage casing, first resilient means urging said inner gage casing away from the valve casing of the vehicle tire, a sliding member within the inner gage casing, means in the inner gage casing for depressing the valve stem of the vehicle tire, a pressure surface on the sliding member for contact with air under pressure emitted from the vehicle tire, second resilient means urging the sliding member against the force exerted by the air pressure, said inner gage casing having a pair of interior curved recesses, an indicator element in the inner casing, a gear on each side of the indicator element, said sliding member including a pair of spaced apart gear racks, each of said gear racks engaging one of said gears, a member having a curved surface on each gear and received in said curved recesses to rotatably mount the indicator element, depression of said inner gage casing into the outer gage casing against the action of said first resilient means causing depression of the valve stem of the vehicle tire with the consequent release of air under pressure from the vehicle tire which operates to move the sliding member against the action of said second resilient means to thereby cause rotation of the indicator element to a position indicating the air pressure in the vehicle tire.

No references cited.

LOUIS R. PRINCE, *Primary Examiner.*